US012338108B2

(12) United States Patent
Schiphorst et al.

(10) Patent No.: US 12,338,108 B2
(45) Date of Patent: Jun. 24, 2025

(54) SELF-LOCKING JACK

(71) Applicant: Enerpac Heavy Lifting Technology B.V., Hengelo Overijssel (NL)

(72) Inventors: Frank Schiphorst, Zwolle (NL); Bas Geerdink, Hengelo (NL); Jeremy Stubbs, Worcester (GB)

(73) Assignee: Enerpac Heavy Lifting Technology B.V., Hengelo Overijssel (NL)

( * ) Notice: Subject to any disclaimer, the term of this patent is extended or adjusted under 35 U.S.C. 154(b) by 941 days.

(21) Appl. No.: 17/441,376

(22) PCT Filed: Mar. 27, 2020

(86) PCT No.: PCT/US2020/025320
§ 371 (c)(1),
(2) Date: Sep. 21, 2021

(87) PCT Pub. No.: WO2020/198620
PCT Pub. Date: Oct. 1, 2020

(65) Prior Publication Data
US 2022/0185640 A1 Jun. 16, 2022

Related U.S. Application Data

(60) Provisional application No. 62/825,564, filed on Mar. 28, 2019.

(51) Int. Cl.
*B66F 1/02* (2006.01)

(52) U.S. Cl.
CPC .................................... *B66F 1/025* (2013.01)

(58) Field of Classification Search
CPC ........................................................ B66F 1/025
See application file for complete search history.

(56) References Cited

U.S. PATENT DOCUMENTS

| | | | | |
|---|---|---|---|---|
| 2,408,181 A * | 9/1946 | Simonton | F15B 15/261 | 254/93 H |
| 4,427,181 A | 1/1984 | Andersson | | |
| 4,930,750 A | 6/1990 | De Castro | | |
| 5,183,235 A * | 2/1993 | Arzouman | B66F 5/04 | 403/328 |
| 5,379,974 A * | 1/1995 | Slay | B66F 1/04 | 248/161 |

(Continued)

FOREIGN PATENT DOCUMENTS

NL 1042448 B1 1/2019

OTHER PUBLICATIONS

International Search Report with Written Opinion for related Application No. PCT/US2020/025320 dated Jul. 10, 2020 (11 Pages).

(Continued)

*Primary Examiner* — Seahee Hong
(74) *Attorney, Agent, or Firm* — Andrus Intellectual Property Law, LLP

(57) ABSTRACT

A jack includes a main body (14) with a cavity (18). A lifting cylinder (42) is supported on the main body and is extendable into the cavity. A lock (30, 34) is movably coupled to the main body. A spring (38) is coupled to the lock and biases the lock into the cavity. A cylinder (86) is coupled to the lock and biases the lock out of the cavity against the biasing force of the spring.

20 Claims, 13 Drawing Sheets

(56) References Cited

U.S. PATENT DOCUMENTS

| | | | | | |
|---|---|---|---|---|---|
| 5,419,533 | A * | 5/1995 | Barta | B66F 3/24<br>254/93 H |
| 6,443,413 | B1 * | 9/2002 | Hawkins | F16M 11/18<br>403/379.5 |
| 6,464,192 | B1 * | 10/2002 | Gibbs, Jr. | B66F 7/18<br>254/93 H |
| 7,413,167 | B2 * | 8/2008 | Arzouman | B66F 3/12<br>254/133 R |
| 7,434,782 | B2 * | 10/2008 | Arzouman | B66F 13/00<br>254/2 B |
| 9,114,966 | B2 * | 8/2015 | Arzouman | B66F 5/04 |
| 2005/0104050 | A1 * | 5/2005 | Spencer | B66F 3/30<br>254/93 H |
| 2011/0278404 | A1 * | 11/2011 | Hanlon | B66F 1/06<br>248/161 |

OTHER PUBLICATIONS

Abstract Modification in response to International Search Report PCT/US2020/025320 dated Jul. 10, 2020.

Enerpac, "BLS506 55 ton Capacity, 5.91 in Stroke Climbing Jack", website: https://www.enerpac.com/en-us/hydraulic-climbing-jacks/climbing-jack/BLS506, Product Literature dated Mar. 8, 2019 (5 Pages).

Holmatro, "Results-Oriented Custom Made Solutions for Industrial Use", Product Catalog, available at lease as early as Mar. 8, 2019 (15 Pages).

Sarens, "Climbing System CS 250", Product Brochure, available at lease as early as Mar. 8, 2019, (4 Pages).

Enerpac, "JS125, 140 Jack-Up System", website: https://www.enerpac.com/en-us/jack-up-systems/jack-up-system/US125, Product Literature dated Mar. 8, 2019 (7 Pages).

Enerpac, "PL20014ASA, 1779 kN, 356mm Stroke, Pow'R-LOCK Self-Locking Portable Lifting Jack", website: https://www.enerpac.com/en-gb/wheeled-jacks/powr-lock-jack-pneumatidPL20014ASA, Product Literature dated Mar. 8, 2019 (6 Pages).

Canadian Examination Report issued in Corresponding Canadian Application No. 3,134,854, dated Mar. 25, 2024.

European Application No. 20722708.3, European Examination Report dated Jan. 16, 2024, 5 pages.

Examination Report for Australian Patent Application No. 2020248086, dated Jan. 20, 2025.

* cited by examiner

SELF-LOCKING JACK

CROSS-REFERENCE TO RELATED APPLICATIONS

This application claims the benefit of prior-filed, U.S. Provisional Patent Application No. 62/825,564, filed on Mar. 28, 2019, the entire contents of which are incorporated by reference.

TECHNICAL FIELD

The present disclosure relates to jack for lifting and lowering a load, and an automated locking system for a jack.

BACKGROUND

Climbing jacks can lift and support heavy loads by incrementally adding cribbing members as a hydraulic cylinder is actuated. As the load is raised, each cycle of operating the hydraulic cylinder includes an operator adding a cribbing member while the load is supported by the hydraulic cylinder.

SUMMARY

In one independent aspect, a jack includes a main body with a cavity. A lifting actuator is supported on the main body and is extendable into the cavity. A lock is movably coupled to the main body. A spring is coupled to the lock and biases the lock into the cavity. A lock actuator is coupled to the lock and biases the lock out of the cavity against the biasing force of the spring.

In another independent aspect, a jack includes a main body with a cavity. A first lock is movably coupled to the main body and a second lock is movably coupled to the main body. The second lock is positioned opposite the first lock. The first lock and the second lock are biased into the cavity. A main actuator is coupled to the main body and movable through the cavity.

In yet another independent aspect, a method is provided for supporting a load with a jack. The jack includes a main body with a cavity and locks biased into the cavity. The method includes positioning a cribbing block proximate the cavity and extending a main actuator to engage the cribbing block and lift the cribbing block relative to the cavity. The method also includes moving the locks at least partially out of the cavity to allow the cribbing block to pass between the locks. After the cribbing block passes at least partially through the locks, the method further includes returning the locks to their initial position. Finally, the method includes supporting the cribbing block on an upper surface of the locks.

In still another independent aspect, a jack includes a main body, a jack actuator supported on the main body, a lock supported for movement on the main body, and a lock actuator. The main body includes an end surface and an opening extending through the end surface along a jack axis. The jack actuator is extendable and retractable along the jack axis, and the jack actuator exerts a lifting force to be transmitted to a supported load. The lock is biased toward a first position in which the lock protrudes at least partially into the opening. The lock actuator is coupled to the lock and operable to selectively move the lock toward a second position in which the lock does not protrude into the opening.

In yet another independent aspect, a method is provided for operating a jack to lift a load. The method includes: positioning a cribbing member adjacent a main actuator; extending the main actuator to lift the cribbing member at least partially beyond an end surface of a main body, the cribbing member transmitting a lifting force from the main actuator to the load; supporting the cribbing member on a lock positioned adjacent the end surface; and retracting the main actuator away from the cribbing member.

In still another independent aspect, a method is provided for operating a jack to lower a load. The method includes: moving a main actuator to support a cribbing member independent of a lock, the cribbing member transmitting a lifting force from the main actuator to the supported load; retracting the lock; moving the main actuator to lower the cribbing member; extending the lock; after the cribbing member has been lowered past the lock, removing the cribbing member from the main actuator.

Other aspects of the disclosure will become apparent by consideration of the detailed description and accompanying drawings.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

Relative terminology, such as, for example, "about," "approximately," "substantially," etc., used in connection with a quantity or condition would be understood by those of ordinary skill to be inclusive of the stated value and has the meaning dictated by the context (for example, the term includes at least the degree of error associated with the measurement accuracy, tolerances (e.g., manufacturing, assembly, use, etc.) associated with the particular value, etc.).

In general, the present disclosure relates to a climbing jack for supporting a load. The climbing jack includes a locking system that is automatically biased to a locked position in order to support the load and any supplemental materials e.g., box materials, such as a cribbing member or block or cube.

Figure 1:
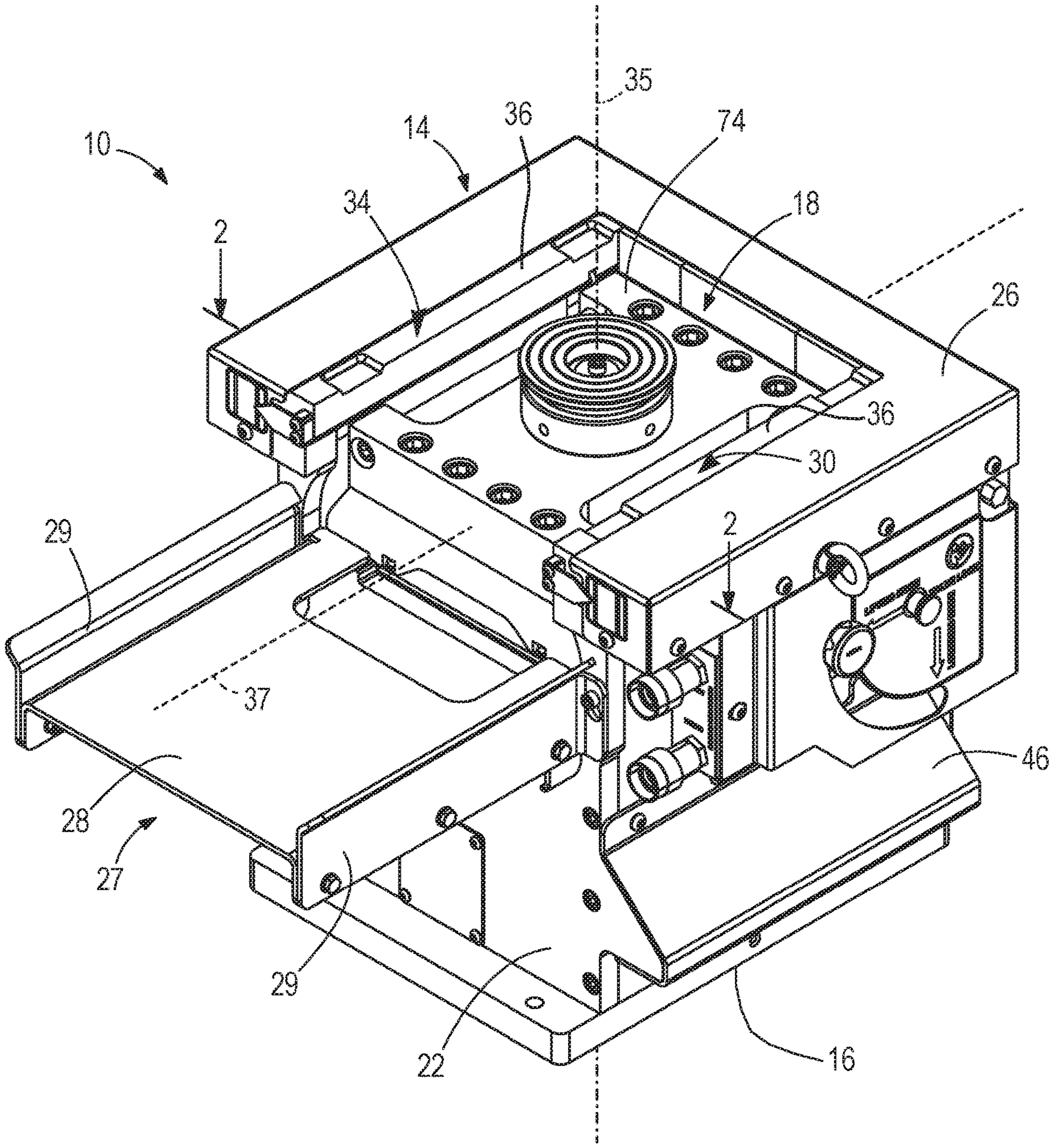
FIG. 1 is a perspective view of a self-locking jack.

As shown in FIG. 1, a jack 10 includes a housing or main body 14. In the illustrated embodiment, the main body 14 has a generally rectangular prismatic shape (i.e., each side of the main body 14 has a generally rectangular profile). A base 16 is positioned adjacent a lower end for engaging a support surface (e.g., the ground), and an upper end 26 is positioned opposite the base 16. In the illustrated embodiment, the upper end 26 includes an opening to a cavity 18 that is positioned proximate an upper portion of the main body 14, and a first or front side 22 of the main body 14 is at least partially open to the cavity 18. The opening in the front side 22 intersects the opening in the upper end 26, forming a continuous opening to the cavity 18 between the front side 22 and the upper end 26. The cavity 18 is a generally rectangular space, and the openings on the front side 22 and the upper end 26 have rectangular profiles. In other embodiments, the cavity 18 may be formed in a different manner.

Also, in the illustrated embodiment, a loading guide or tray 27 is coupled to the front side 22 of the main body 14 and positioned adjacent the cavity 18. The tray 27 includes a planar surface 28 and a pair of side walls 29, which extend parallel to an insertion axis 37. The side walls 29 are substantially aligned with the sides of the cavity 18, and the planar surface 28 is substantially aligned with a lower surface of the cavity 18.

Figure 2:
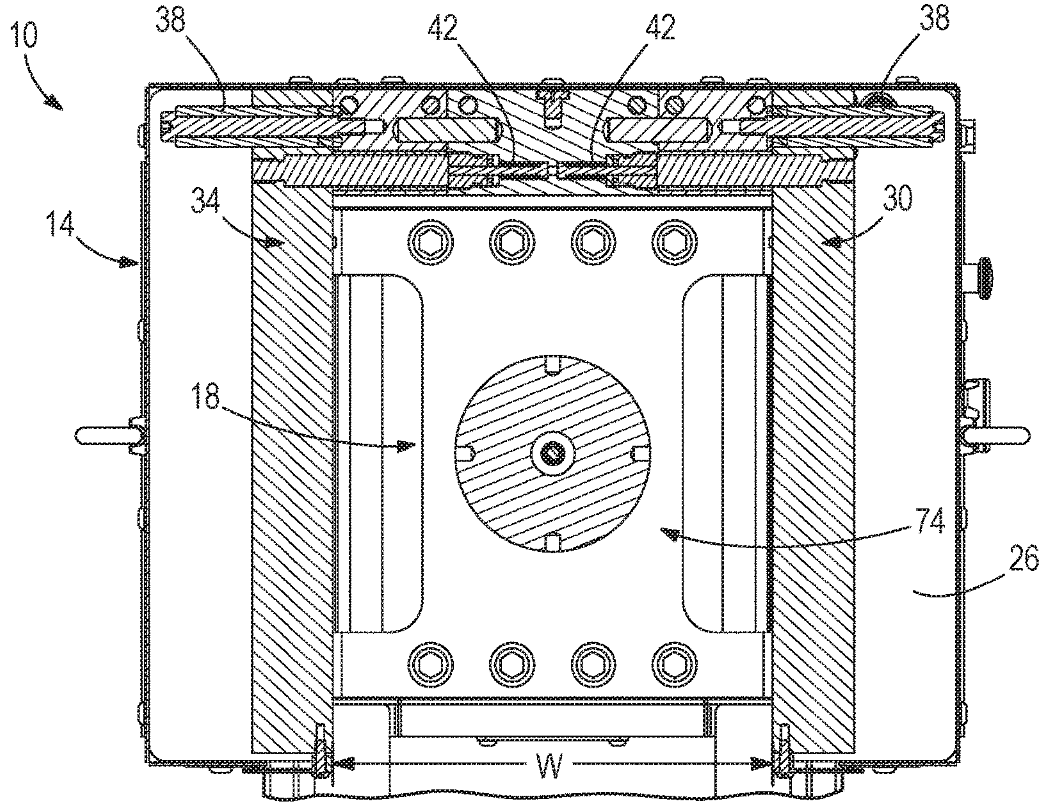
FIG. 2 is a top view of the self-locking jack of FIG. 1.

As shown in FIGS. 1 and 2, a first lock 30 and a second lock 34 protrude inwardly toward a center axis 35 (FIG. 1) of the cavity 18 from opposite sides of the main body 14. The locks 30, 34 are positioned proximate the upper portion of the main body 14 (i.e., proximate the upper end 26). Each of the locks 30, 34 includes a generally planar surface 36 that is normal to the center axis 35 (e.g., parallel to the upper end 26). In the illustrated embodiment, the locks 30, 34 are elongated and extend along the sides of the cavity 18, in a direction parallel to the insertion axis 37 (FIG. 1), and each of the planar surfaces 36 has a generally rectangular shape.

As shown in FIG. 2, each lock 30, 34 is coupled to an associated biasing member or spring 38 and a fluid actuator 42 (e.g., a hydraulic cylinder). Although the springs 38 are illustrated in FIG. 2 as cylindrical members for simplicity, it is understood that the springs 38 may be formed as any of various types of biasing members (e.g., a coil spring). Both the spring 38 and the fluid actuator 42 can apply a force to the respective lock 30, 34. In the illustrated embodiment, the spring 38 biases the associated one of the locks 30, 34 toward a center of the cavity 18 (i.e., toward the opposite lock 34, 30). The fluid actuator 42 biases the associated one of the locks 30, 34 away from the center of the cavity 18 (i.e., away from the opposite lock 34, 30) when a pressurized fluid (e.g., oil) is supplied to the fluid actuators 42. In a nominal or locked state, the force exerted by the spring 38 generally exceeds the force exerted by the fluid actuator 42, and the locks 30, 34 protrude inwardly toward the center of the cavity 18. For example, when the fluid actuators 42 are unloaded (i.e., not supplied with a pressurized fluid), the locks 30, 34 are biased toward the center of the cavity 18. In the locked stated, the locks 30, 34 are spaced apart by a distance W, which in the illustrated embodiment is slightly less than the width of the cavity 18 in a direction transverse to the insertion axis 37.

Figure 3:
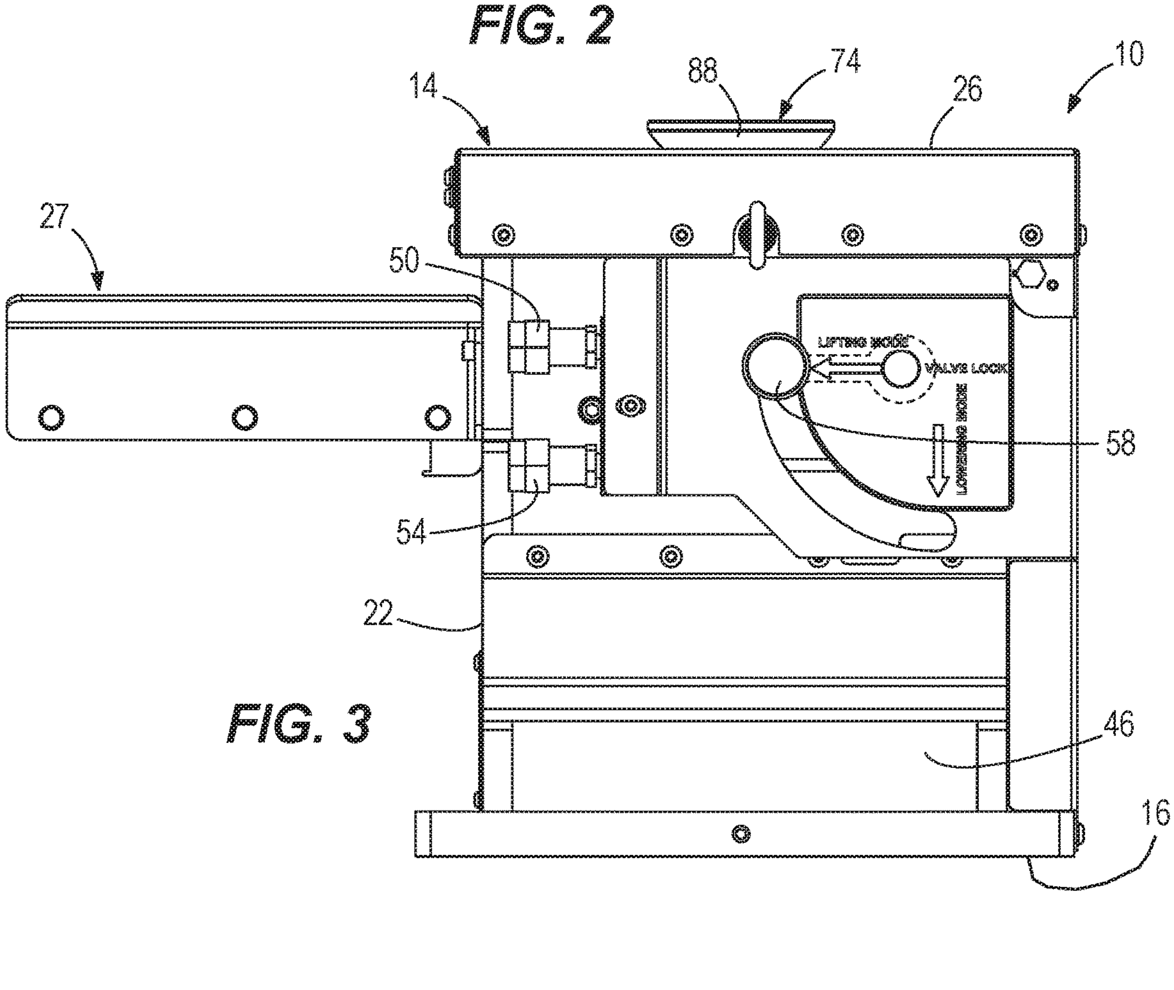
FIG. 3 is a first side view of the self-locking jack of FIG. 1, illustrating a manual lever.
Figure 4:
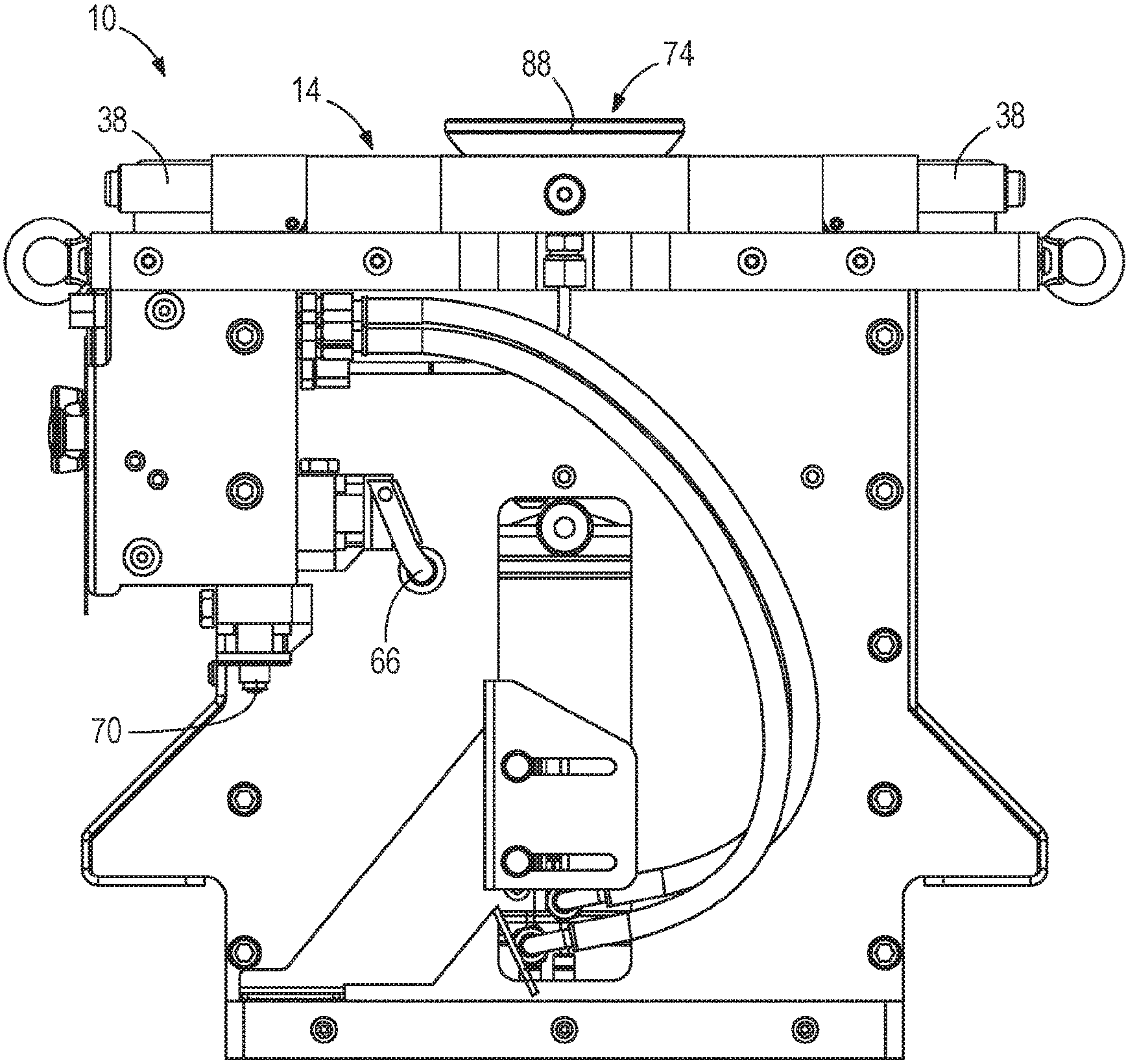
FIG. 4 is a second side view of the self-locking jack of FIG. 1, illustrating hydraulic switches.

As shown in FIG. 3, the jack 10 also includes a first fluid port 50 and a second fluid port 54. In the illustrated embodiment, the ports 50, 54 are positioned on a side 46 of the main body 14. The ports 50, 54 provide fluid communication between a fluid source (e.g., a pump and reservoir—not shown) and the jack 10. In the illustrated embodiment, each port 50, 54 can act as an inlet or an outlet (depending on the stage of operation). An actuator 58 is movable between a first position and a second position to adjust a mode of operation of the jack 10. In the illustrated embodiment, the actuator 58 is a manually-operated lever. In some embodiments, a lock (not shown) may secure the actuator 58 against inadvertent movement between the first position and the second position. In other embodiments, the actuator may be electronically and/or wirelessly controlled. As shown in FIG. 4, the jack 10 includes a first switch (e.g., a hydraulic switch) 66 and a second switch (e.g., a hydraulic switch) 70. Each switch 66, 70 is in fluid communication with an associated one of the fluid ports 50, 54, and flow of fluid entering the fluid port 50 may reach the switches 66, 70 based on the position of the valve 62.

The position of the actuator 58 controls the mode of operation (e.g., lifting or lowering) of the jack 10. In a first or lifting position, the jack 10 is capable of lifting a supported load. In a second or lowering position, the jack 10 can lower the supported load or may be lowered itself (e.g., because the load is being supported by something other than the jack 10).

Figure 5:
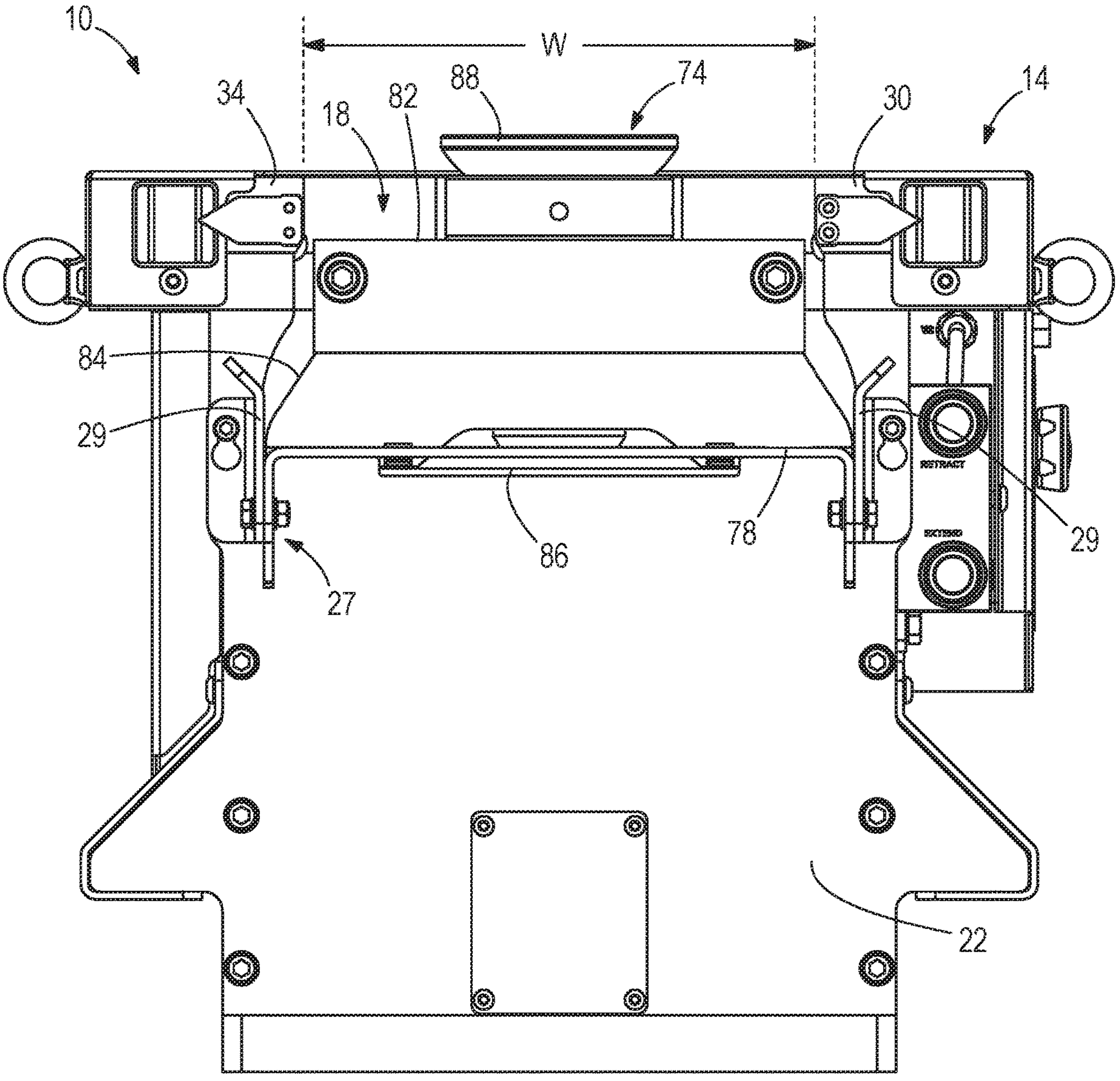
FIG. 5 is a front view of the self-locking jack of FIG. 1, illustrating a cribbing block positioned in a cavity of the jack.

The jack 10 supports the load by sequential stacking of support members, such as one or more cubes or cribbing blocks 74. As shown in FIG. 5, each block 74 includes a lower end 78 and an upper end 82. In the illustrated embodiment, the lower end 78 is wider than the upper end 82, and outer surfaces 84 of the block 74 adjacent the lower end 78 taper inwardly from the lower end 78 toward the upper end 82. A maximum width of the block 74 (i.e., the width proximate the lower end 78) is substantially equal to a width between the side walls 29 of the tray 27 and the width of the cavity 18. A block 74 may be placed on the tray 27 between the side walls 29, and inserted into the cavity 18 in the direction of insertion axis 37 (FIG. 1). In the illustrated embodiment, the upper end 82 of the block 74 extends above a lower surface of the locks 30, 34 while the block 74 is positioned within the cavity 18. A minimum width of the block 74 (i.e., the width proximate the upper end 82) is less than the distance W between the locks 30, 34 in the locked state. This allows the block 74 to be received in the cavity 18 while the locks 30, 34 are in the locked position (i.e., biased toward each other by the force of the springs 38).

In the illustrated embodiment, one block 74 is positioned in the cavity 18 at a time. Each block 74 is positioned in the cavity 18 to be centered or aligned with respect to a main actuator or main cylinder 86. While the block 74 is being inserted, the main cylinder 86 is in a retracted position (e.g., within the main body 14) and does not extend above the lower surface of the cavity 18. The main cylinder 86 is positioned below the lower end 78 of the block 74. Once actuated, the main cylinder 86 applies a force on the lower end of the block 74.

To operate the jack 10, the fluid source is placed in communication with the main cylinder 86, and fluid enters the main body 14 through one of the ports 50, 54. Movement of the lever 58 actuates a valve 62 (FIG. 6) to control fluid communication with the fluid actuators 42 of the locks 30, 34. To initiate the lifting operation, the lever 58 is positioned in the lifting position. In the illustrated embodiment, while the lever 58 is in the lifting position, pressurized fluid flows to the main cylinder 86 and causes the main cylinder 86 to extend. The valve 62 is closed to prevent flow to the fluid actuators 42. In the illustrated embodiment, the valve 62 is a ball valve; in other embodiments, another type of valve (e.g., a directional flow control valve) may be used. In the illustrated embodiment, the port 50 is in communication with a cap side or bottom side of the main cylinder 86. The port 54 is in fluid communication with a rod side of the main cylinder 86.

Figure 7B:
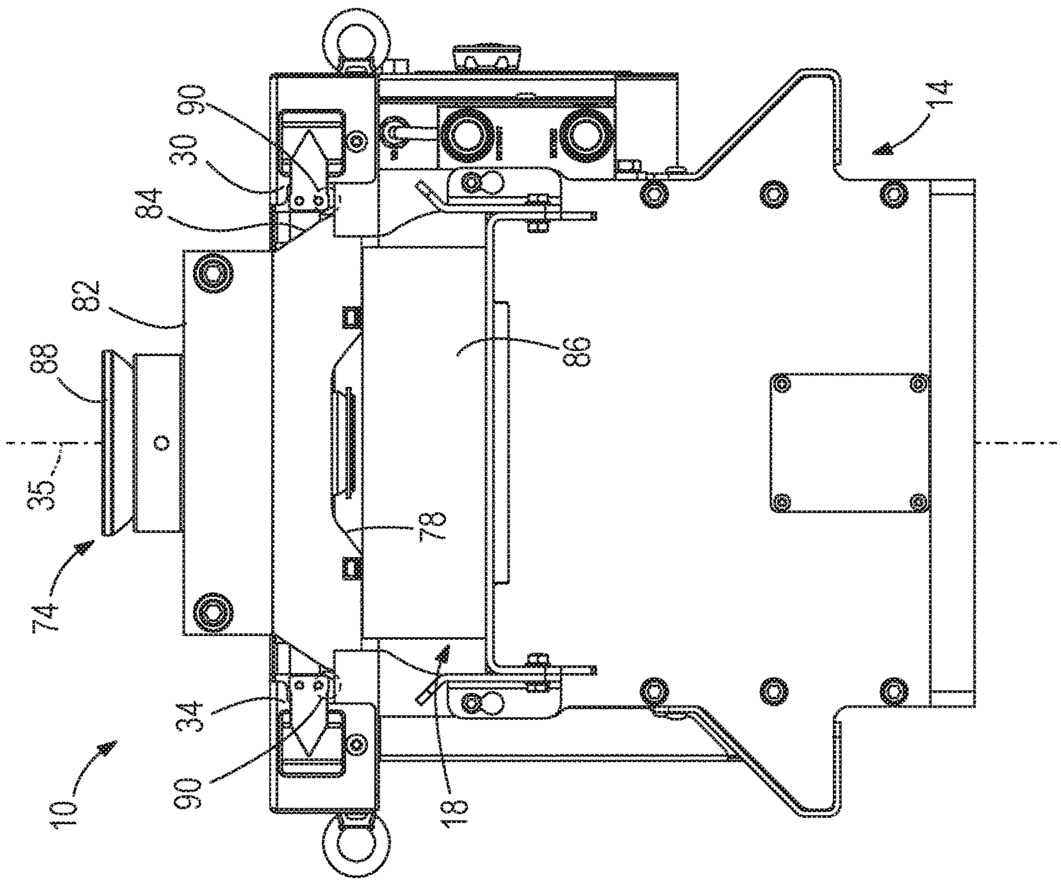
FIG. 7B is a front view of the self-locking jack of FIG. 1, illustrating the main cylinder lifting the cribbing block past spring loaded locks.
Figure 7A:
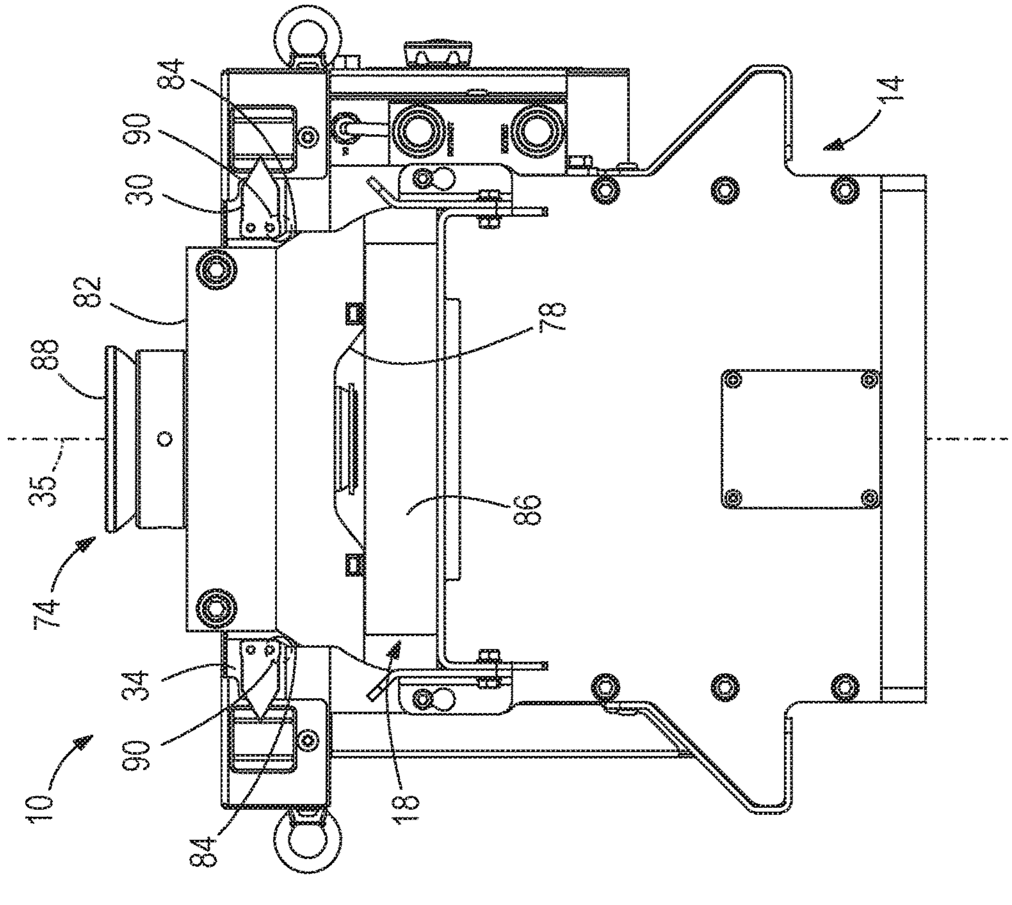
FIG. 7A is a front view of the self-locking jack of FIG. 1, illustrating a main cylinder initially lifting the cribbing block.

As shown in FIG. 7A, extension of the main cylinder 86 into the cavity 18 of the main body 14 causes the main cylinder to contact and exert a force against the lower end 78 of the block 74. The lower end 78 of the block 74 is lifted toward the upper end 26, while being supported by the main cylinder 86. In the illustrated embodiment, as the block 74 is raised, the upper end 82 of the block 74 passes between the locks 30, 34 in their extended or locked position because the upper end 82 is narrower than the distance W. The lower end 78 of the block 74, however, is unable to pass between the locks 30, 34 while the locks 30, 34 are extended since the lower end 78 has a width greater than the distance W between the locks 30, 34 while in the locked position.

As shown in FIGS. 7A and 7B, the tapered surfaces 84 of the block 74 contact the lower surface of the locks 30, 34. Due to the engagement between the inclined surfaces 84 and the lock surfaces, a lateral component of the force exerted by the main cylinder 86 is directed toward the locks 30, 34 and overcomes the biasing forces of the springs 38. The locks 30, 34 follow the contours of the tapered edges 84 as the main cylinder 86 lifts the block 74. In some embodiments, at the lowest point of the block 74, the locks 30, 34 are biased to retract almost completely out of the cavity 18 in order to accommodate the full width of the block 74 (see e.g., FIG. 7B). In the illustrated embodiment, a wheel 90 is coupled to a respective lower edge of each lock 30, 34 to reduce the frictional force between the locks 30, 34 and the tapered edges 84, allowing the block 74 to move smoothly past the locks 30, 34.

Figure 7D:
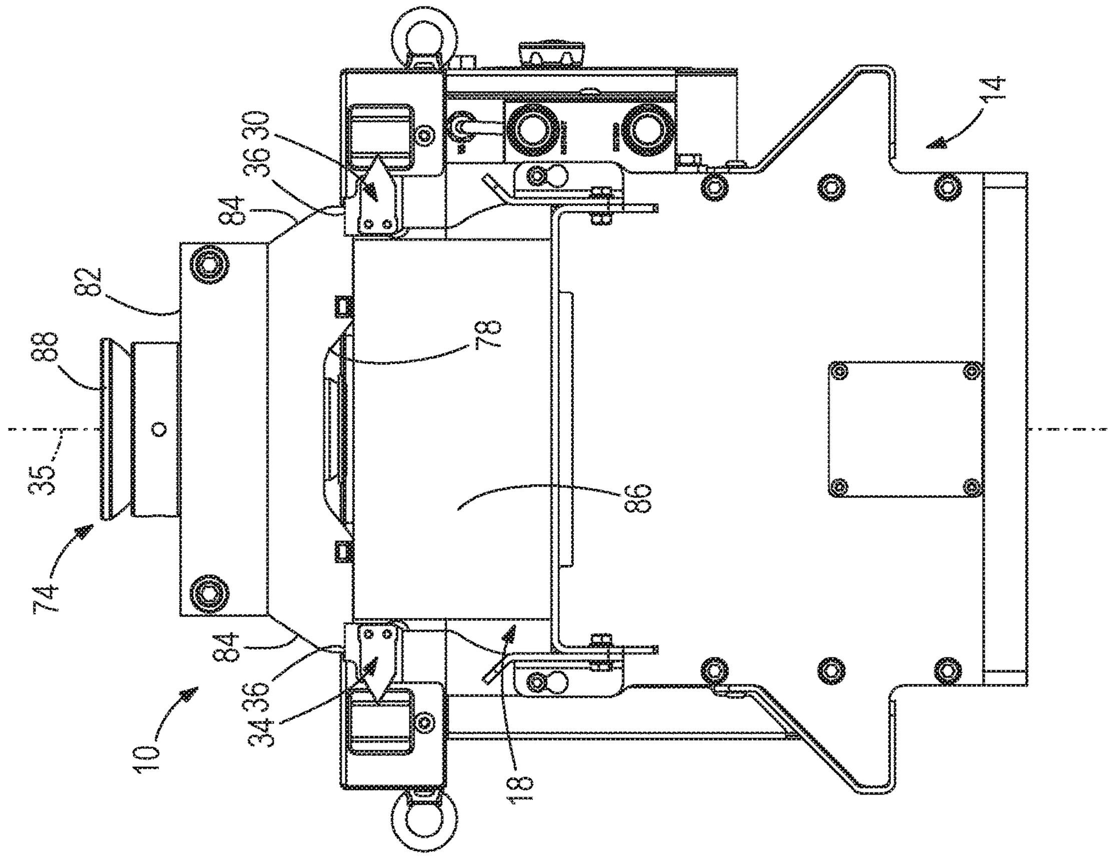
FIG. 7D is a front view of the self-locking jack of FIG. 1, illustrating the main cylinder retracting and the cribbing block supported on the spring loaded locks.
Figure 7C:
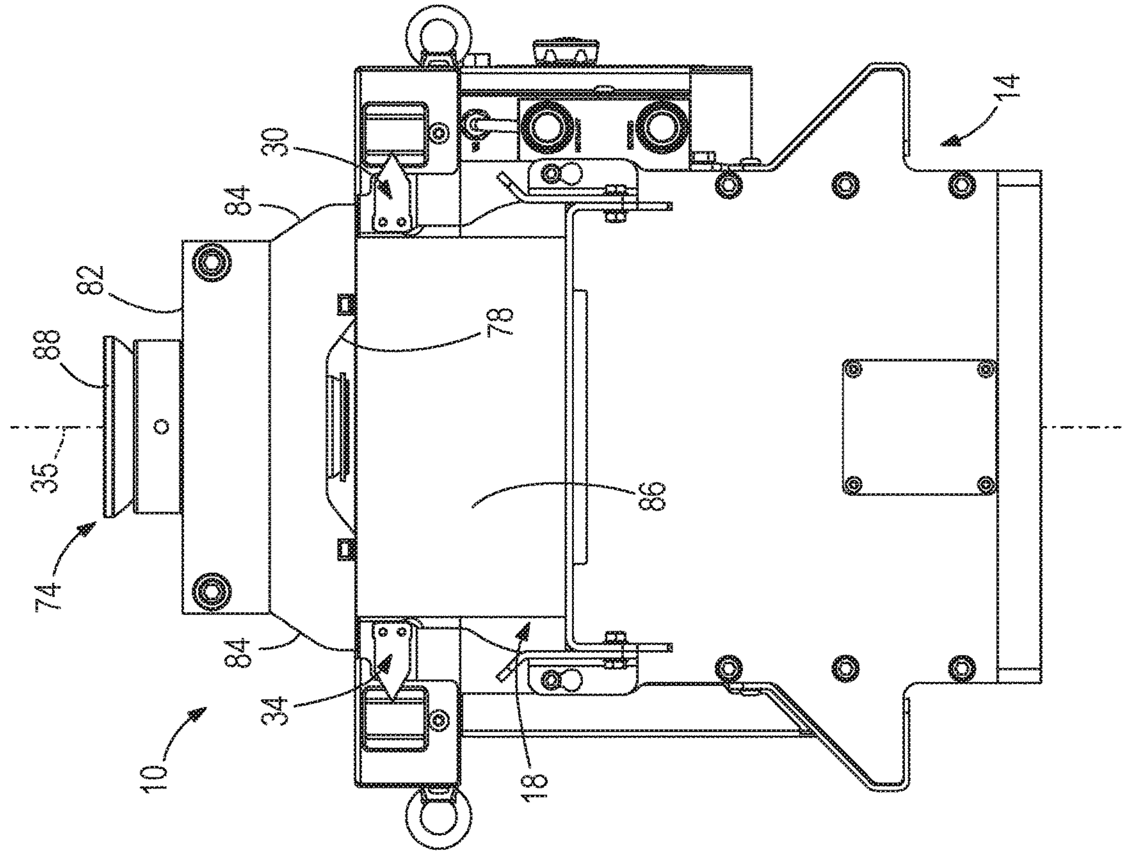
FIG. 7C is a front view of the self-locking jack of FIG. 1, illustrating the main cylinder reaching a fully extended position where the cribbing block is above the spring loaded locks.

As shown in FIG. 7C, the main cylinder 86 continues to extend until reaching a maximum distance of travel. As the block 74 extends out of the cavity 18, an engagement portion of 88 of the block 74 applies a force to raise the load. At this point, the main cylinder 86 may be substantially flush with the upper end 26 of the main body 14. The block 74 extends above the upper end 26 and remains supported on the main cylinder 86. After the tapered edges 84 have moved past the locks 30, 34, the springs 38 bias the locks 30, 34 to return to the locked position.

Figure 6:
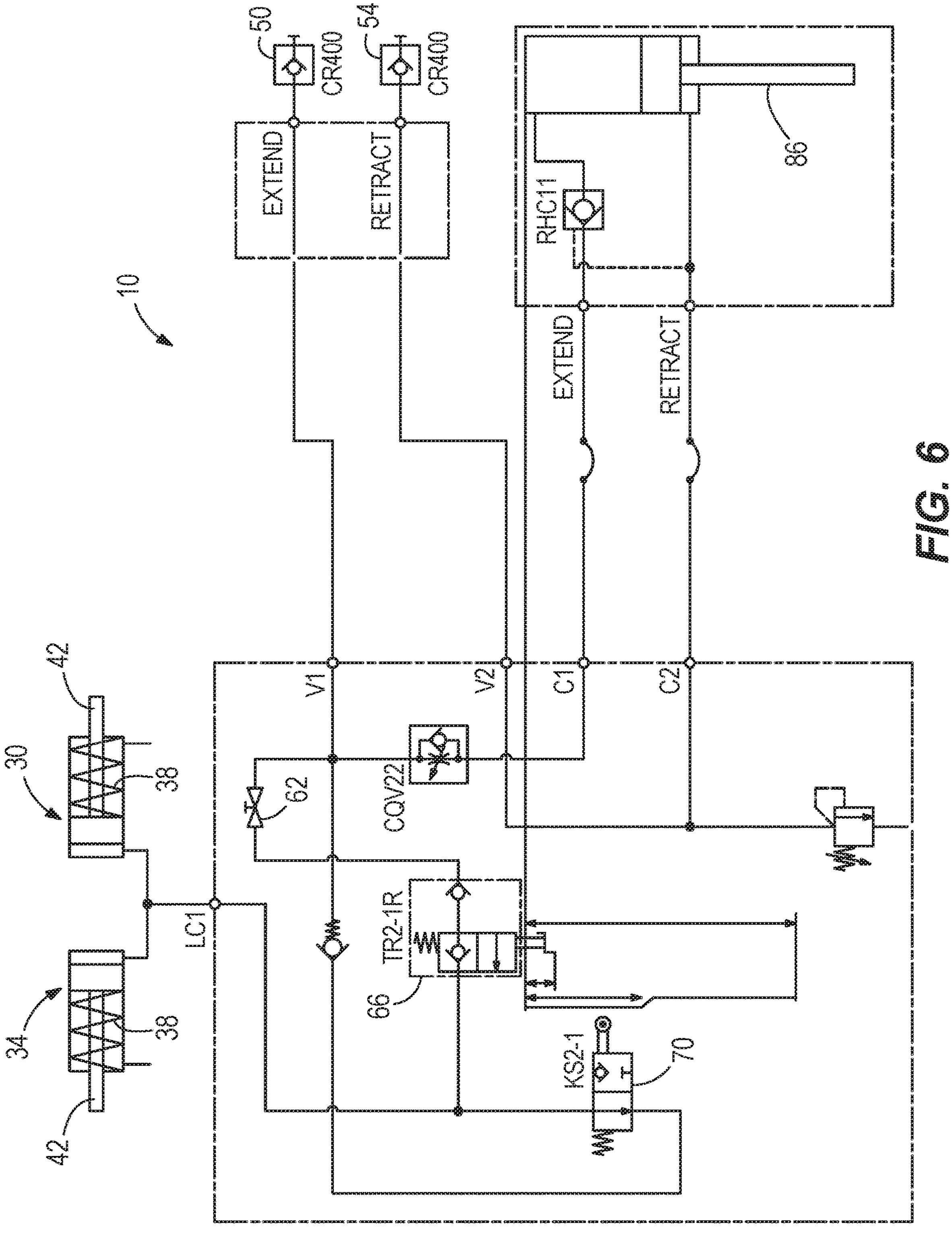
FIG. 6 is a hydraulic circuit diagram for the self-locking jack of FIG. 1.

Returning to FIG. 6, the main cylinder 86 begins to retract after reaching the maximum distance of travel and hydraulic fluid is forced out of the main body 14 through the port 50. The block 74 returns toward the upper end 26 as the main cylinder 86 retracts. As shown in FIG. 7D, the block 74 is supported on the upper planar surfaces 36 of the locks 30, 34 after the main cylinder 86 retracts below the planar surfaces 36. The locks 30, 34 remain in the locked position since the width of the main cylinder 86 is less than the distance W, and therefore passes between the locks 30, 34 unimpeded. The lower end 78 of the block 74 is wider than the distance W (see e.g., FIG. 5), and engages the upper surface of the locks 30, 34 rather than continuing to retract with the main cylinder 86. The planar surfaces 36 provide a flat surface to support the weight of the block 74 and the load above the block 74.

Figure 7E:
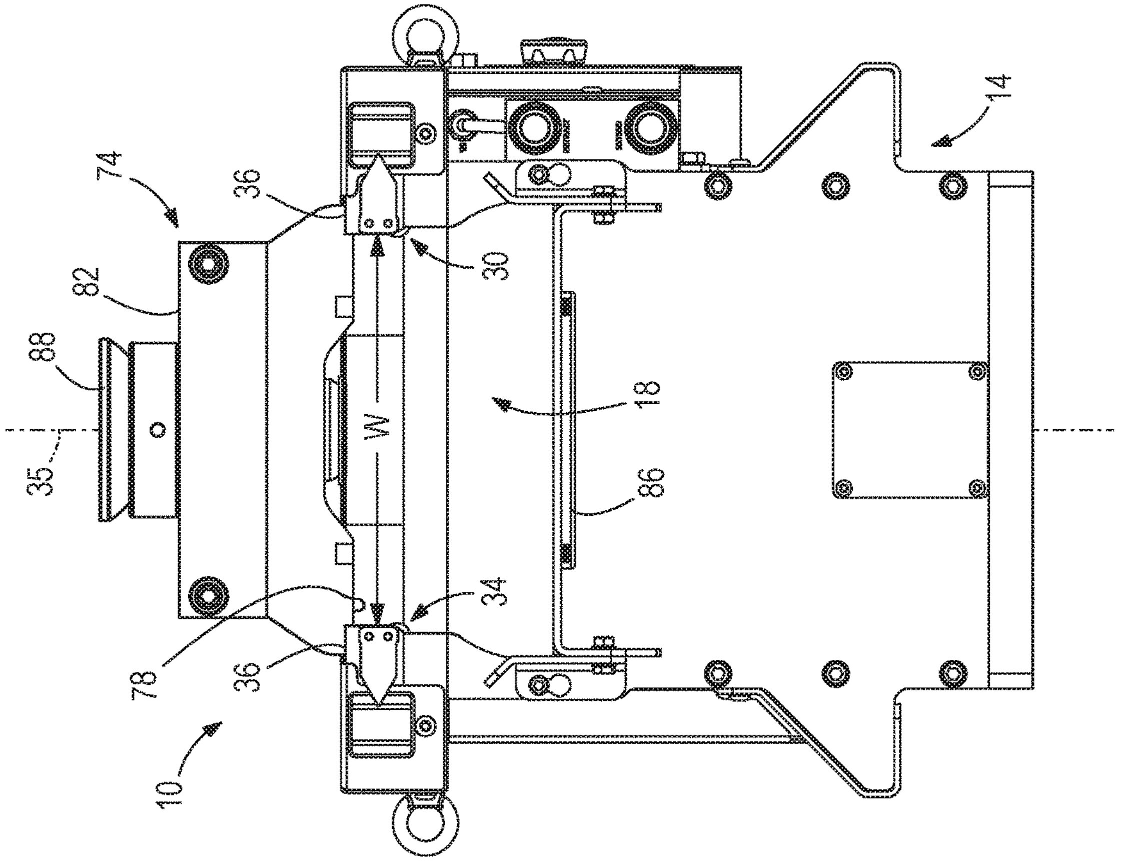
FIG. 7E is a front view of the self-locking jack of FIG. 1, illustrating the main cylinder in a fully retracted position and the cribbing block supported on the spring loaded locks.
Figure 7F:
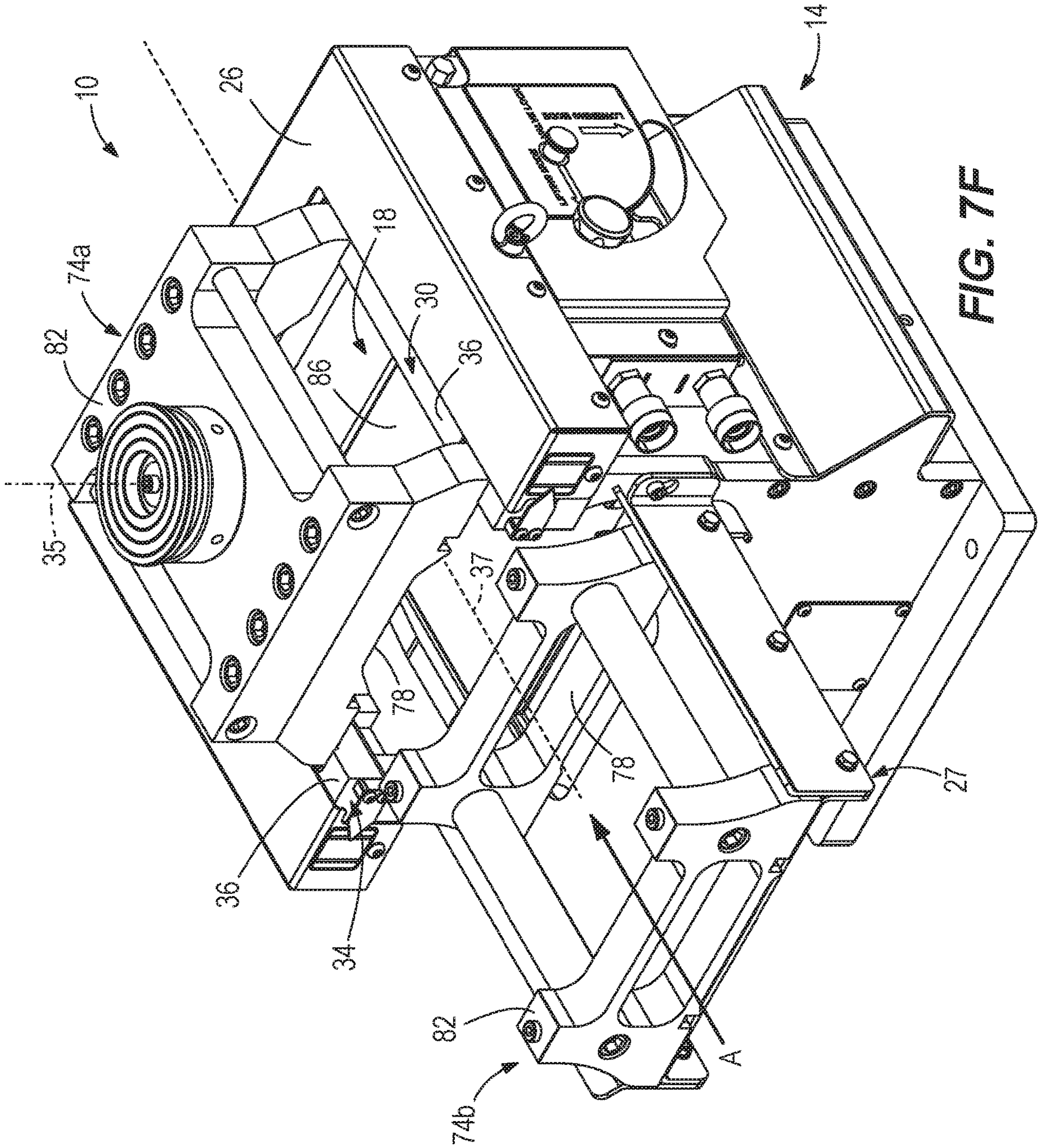
FIG. 7F is a front view of the self-locking jack of FIG. 1, illustrating inserting a second cribbing block into the cavity of the jack.

As shown in FIGS. 7E and 7F, the cavity 18 is no longer obstructed after the main cylinder 86 is completely retracted. As shown in FIG. 7F, a second block **74*b* can be placed onto the tray 27 and loaded into the cavity 18 in a direction A, parallel to insertion axis 37. Once the second block 74*b* is aligned below the block 74, the process of supplying fluid to the main cylinder 86 and lifting the block 74*b* is repeated, resulting in the second block 74*b* being supported on the planar surfaces 36 of the locks 30, 34. As the second block 74*b* is raised by the main cylinder 86, the upper end 82 of the second block 74*b* contacts and transmits a lifting force to the lower end 78 of the block 74 (referred to hereafter as the first block 74*a*). The upper end 82 of the second block 74*b* supports the first block 74*a* as the first block 74*a* is raised away from the planar surfaces 36**.

In the illustrated embodiment, each successive block 74 is substantially the same height as the previous block, so that the load is raised a discrete amount with each successive block 74 added to the stack. A predetermined number of blocks 74 may be added to raise the load to a desired height. In the illustrated embodiment, the first block **74*a* and the second block 74***b* are different. The uppermost block (e.g., first block 74*a*) includes the engagement portion 88 that directly contacts the supported load. Also, the body of the first block 74*a* is substantially solid, although the body may be formed as separate pieces (e.g., an upper portion and a lower portion). Furthermore, the tapered edges 84 of the first block 74*a* are substantially planar, while the second block 74*b* include tapered edges 84 that are curved. In other embodiments, the body of the blocks 74*a*, 74*b* and tapered surfaces may be substantially similar to one another.

No additional supports are needed as successive blocks 74 are added to the stack. Because the locks 30, 34 automatically return to the locked position due to the spring force, the locks 30, 34 are available to support the combined weight of the blocks 74 and load when the combined weight is supported on the main cylinder 86. Among other things, the locks 30, 34 are a fail-safe and can extend into the cavity 18 and support the stack of blocks 74 if the main cylinder 86 were to fail while supporting the stack (e.g., in case of a loss of power). The jack 10 avoids the need for an operator to add blocks 74 while the stack is supported only by the main cylinder 86, thereby reducing the risk for the operator. The locks 30, 34 are also capable of supporting the total combined weight while the main cylinder 86 is in the retracted position.

To lower the load, the lever is moved to the second or lowering position. Referring to FIG. 6, moving the lever 58 to the lowering position opens the valve 62 and provides fluid communication between the port 50 and the first switch 66. In some embodiments, during an initial stage, the first switch 66 is closed and prevents the pressurized fluid from reaching the second switch 70. Additionally, the port 50 remains in fluid communication with the main cylinder 86.

Figure 8C:
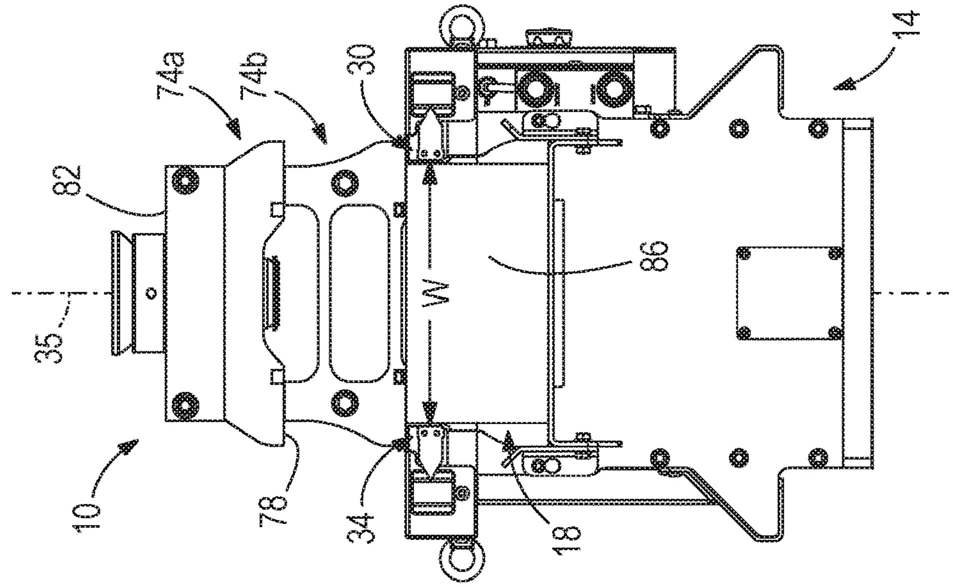
FIG. 8C is a front view of the self-locking jack of FIG. 1, illustrating the main cylinder lifting the first and second cribbing blocks off of the spring loaded locks so that the cribbing blocks are supported by the main cylinder.
Figure 8B:
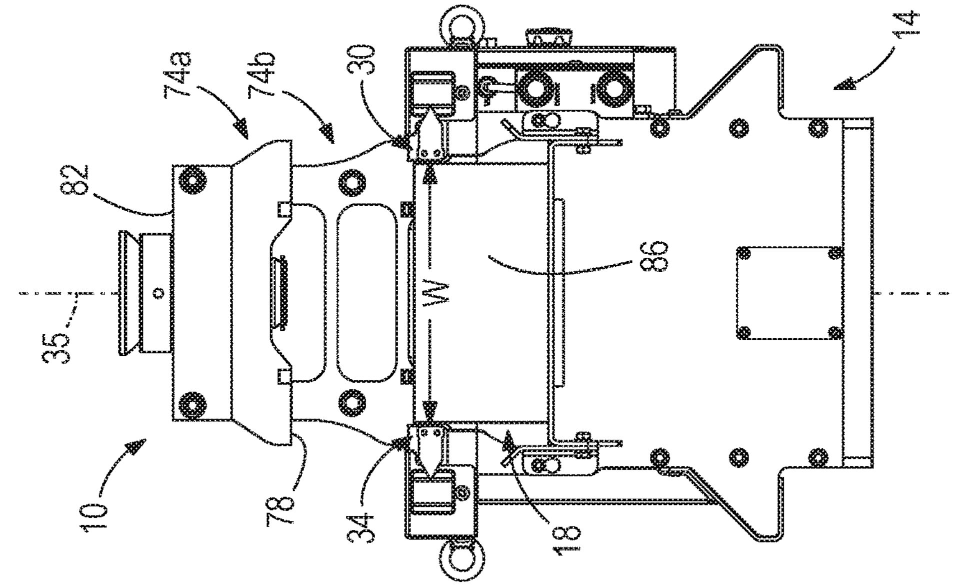
FIG. 8B is a front view of the self-locking jack of FIG. 1, illustrating the main cylinder extending toward the first and second cribbing blocks.
Figure 8A:
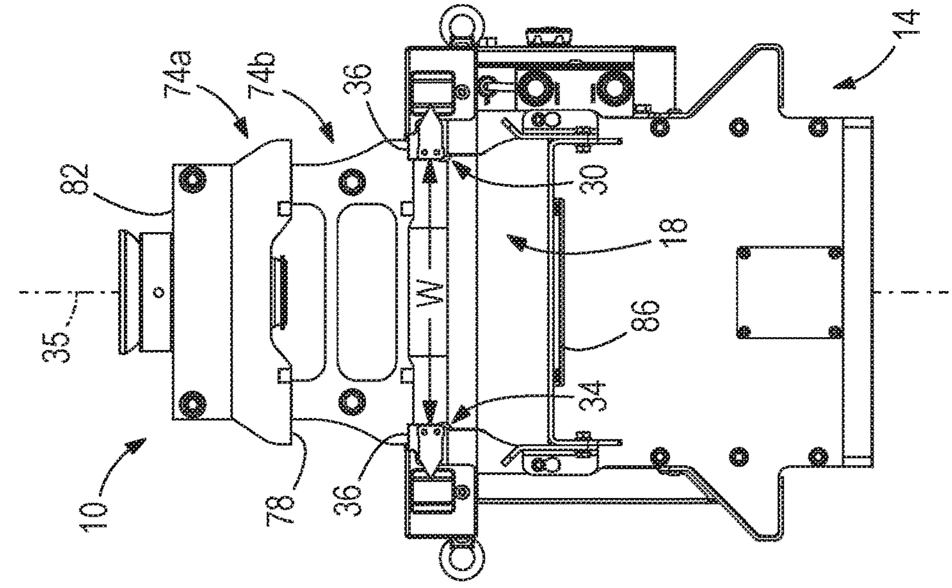
FIG. 8A is a front view of the self-locking jack of FIG. 1, illustrating a first cribbing block and a second cribbing block supported by the spring loaded locks.

As shown in FIGS. 8A-8C, the main cylinder 86 extends into the cavity 18 as hydraulic fluid is supplied to the jack 10. The springs 38 (see e.g., FIG. 2) bias the locks 30, 34 toward the locked position, and the block(s) 74 are supported on the upper planar surfaces 36 of the locks 30, 34. The main cylinder 86 extends between the locks 30, 34 and contacts the lower end 78 of the lowermost block 74 (see e.g., FIG. 8C).

Returning to FIG. 6, after the stack of blocks 74 is lifted away from the planar surfaces 36 and are supported by the main cylinder 86, the second switch 70 and the first switch 66 are actuated. Pressurized fluid retracts the locks 30, 34, and becomes “trapped” between the switches 66, 70 and within the fluid actuators 42. The pressure from the hydraulic fluid on the fluid actuators 42 exceeds the force of the springs 38, thereby moving the locks 30, 34 away from the center of the cavity 18 so that the locks 30, 34 are spaced apart further than the distance W. As shown in FIG. 8D, the locks 30, 34 are moved apart to provide a gap greater than the width of the lower end 78 of the block 74*b*.

In the illustrated embodiment, the second switch 70 closes when the main cylinder 86 is within a first predetermined distance (e.g., 40 mm) from reaching the fully extended position, and the first switch 66 opens to permit fluid flow in one direction when the main cylinder 86 is within a second predetermined distance (e.g., 4 mm) from reaching the fully extended position. The second switch 70 is positioned between the locks 30, 34 and the port 50. The first switch 66 is also positioned between the locks 30, 34 and the port 50. The second switch 70 closes prior to the first switch 66 opening in order to trap pressurized fluid in the fluid actuators 42. Pressurized fluid continues to enter the main body 14 as the main cylinder 86 extends from the first distance to the second predetermined distance. The first switch 66 then opens when the main cylinder 86 reaches the second distance, and allows the built-up pressurized fluid to reach the fluid actuators 42. The first switch 66 allows flow in one direction (i.e., toward the fluid actuators 42) and the second switch 70 is closed, thereby trapping the pressurized fluid in the fluid actuators 42. The built up fluid force is greater than the spring force, and the fluid actuators 42 are able to retract the locks 30, 34 at least partially out of the cavity. The blocks 74 are lifted above the locks 30, 34 and are supported entirely on the main cylinder 86 between the second distance and the end of the stroke.

Figure 8E:
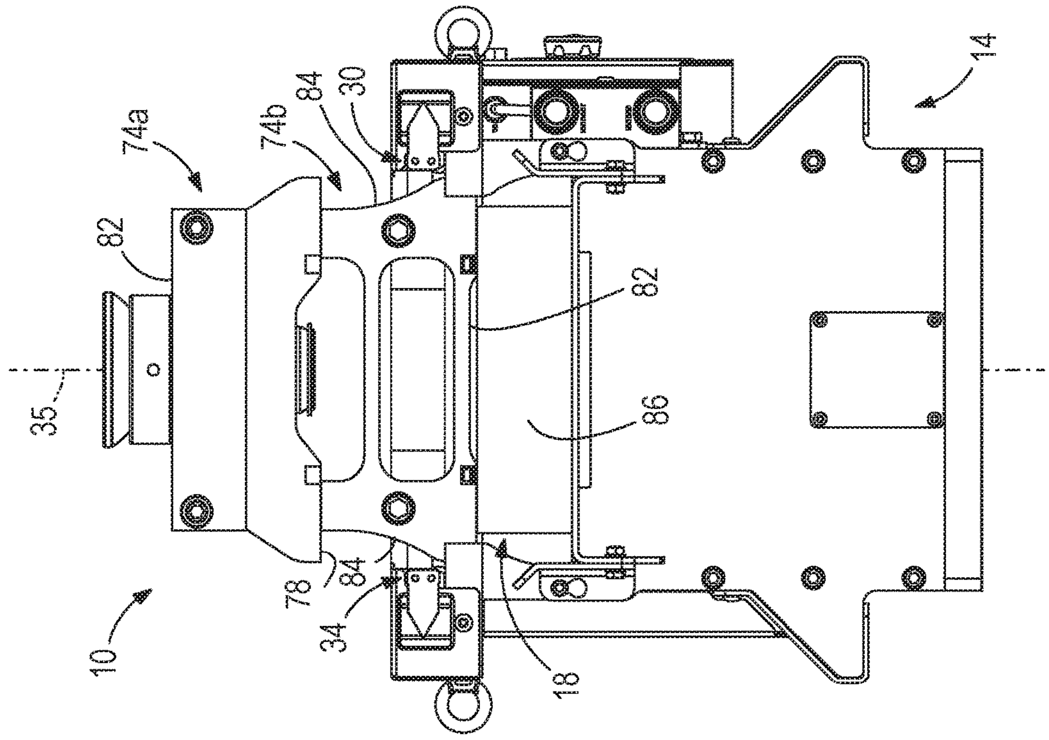
FIG. 8E is a front view of the self-locking jack of FIG. 1, illustrating the main cylinder lowering the first and second cribbing blocks while the hydraulic force continues to act against the spring loaded locks.
Figure 8D:
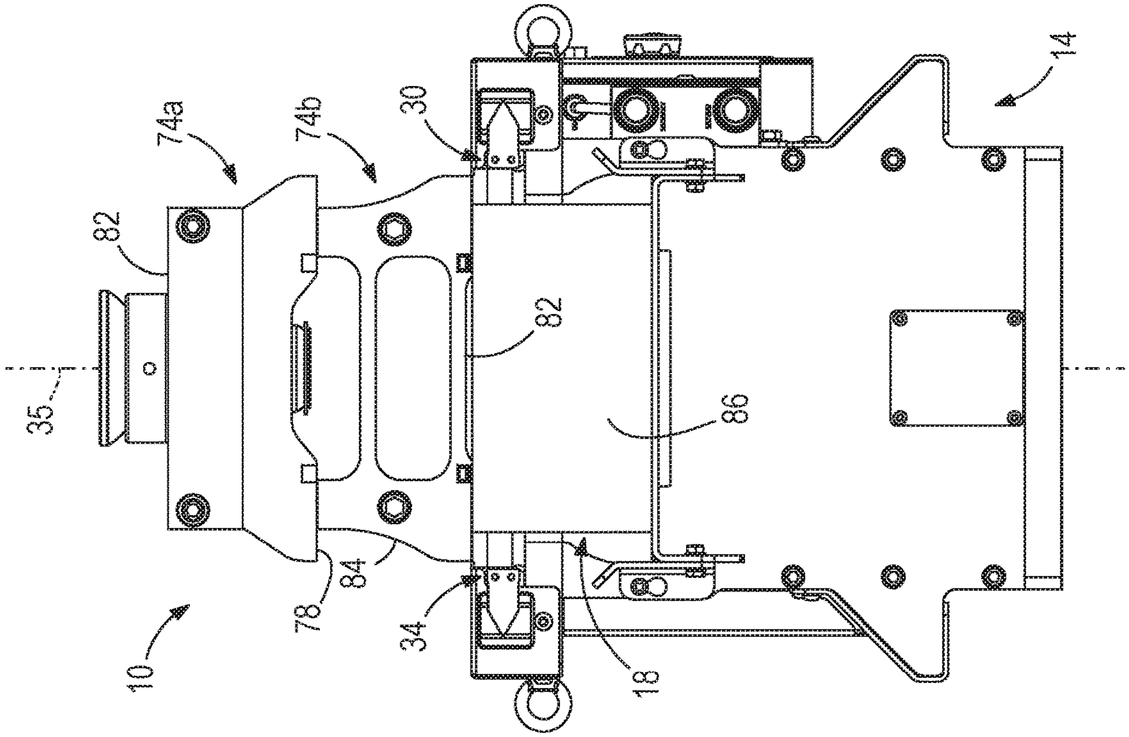
FIG. 8D is a front view of the self-locking jack of FIG. 1, illustrating spring loaded locks being retracted by a hydraulic force while the first and second cribbing blocks are supported by the main cylinder.

As shown in FIG. 8E, the main cylinder 86 begins to retract, and consequently lowers the stack of blocks 74. The switches 66, 70 remain closed, and as the main cylinder 86 retracts the lower end 78 of the lowermost block 74*b* (e.g., the second block) is able to pass between the locks 30, 34. After the main cylinder 86 has been lowered (e.g., to the second distance), the first switch 66 remains in its initial position (e.g., closed) because additional pressurized fluid no longer needs to reach the fluid actuators 42. After the main cylinder 86 has been lowered (e.g., to the first distance) and the lowermost block 74*b* is between the locks 30, 34, the second switch 70 returns to its initial position (e.g., open), providing a fluid flow path to the port 50. Returning the switches 66, 70 to their initial positions allows the hydraulic fluid trapped in the fluid actuators 42 to exit the main body 14, and prevents any additional hydraulic fluid from entering the fluid actuators 42. The force of the springs 38 exceeds the force of the fluid actuators 42, and the locks 30, 34 are biased toward the locked position.

Figure 8H:
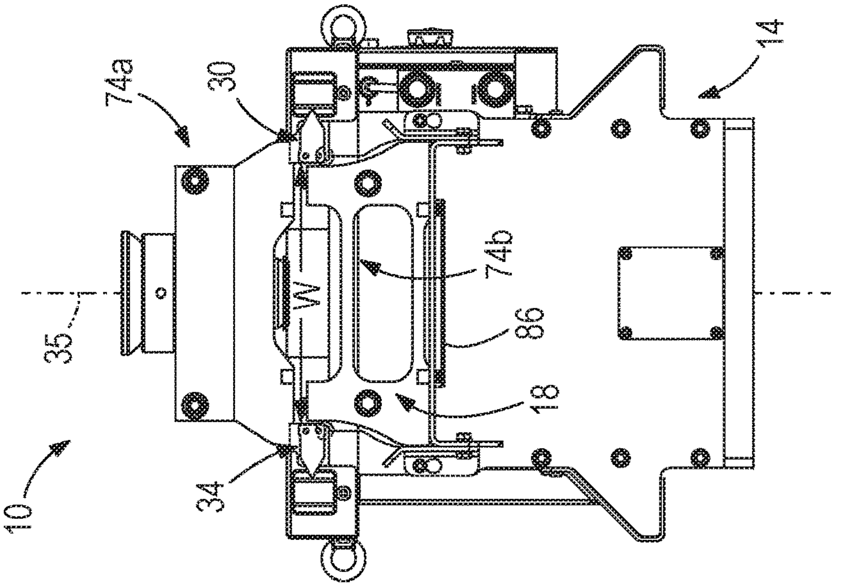
FIG. 8H is a front view of the self-locking jack of FIG. 1, illustrating the main cylinder in the fully retracted position where the first cribbing block is supported on the locks and the second cribbing block is supported in the cavity.
Figure 8G:
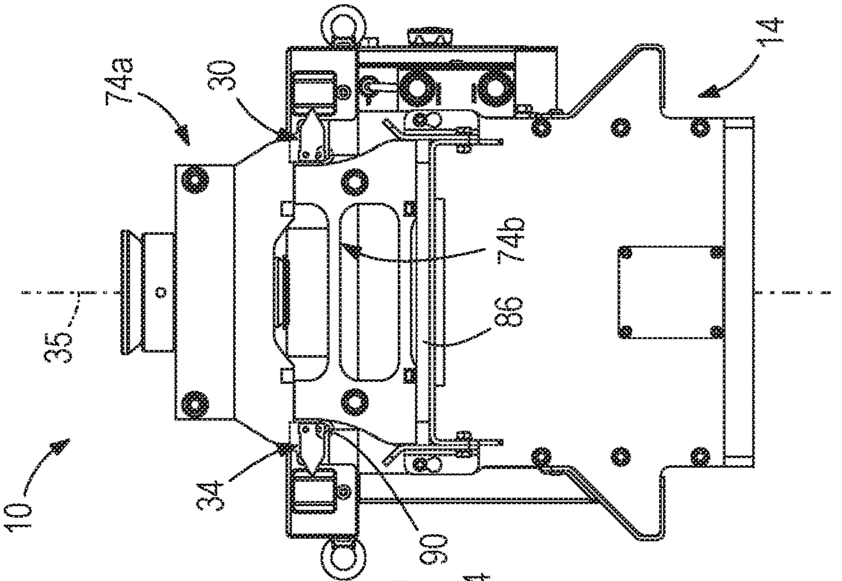
FIG. 8G is a front view of the self-locking jack of FIG. 1, illustrating the spring loaded locks returning to their locked position where the first cribbing block is supported on the locks and the second cribbing block is supported on the cylinder.
Figure 8F:
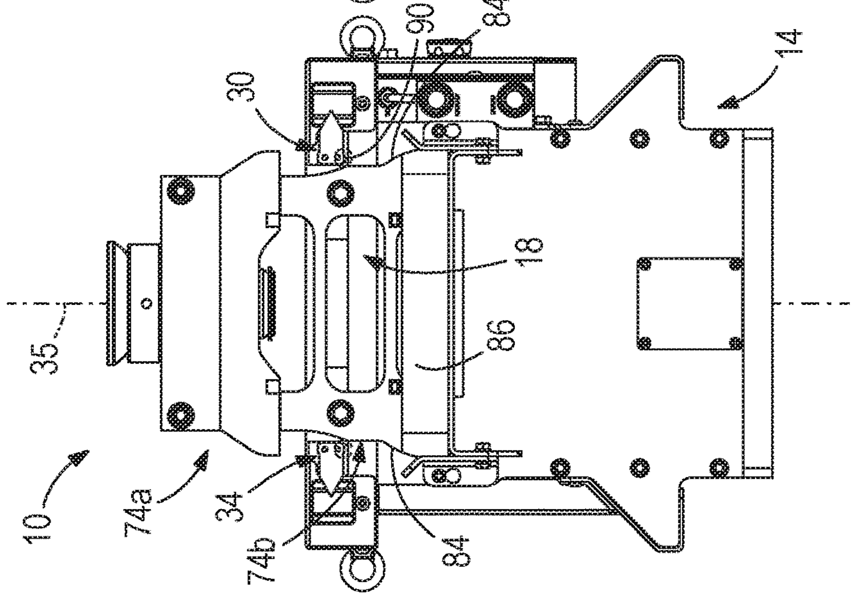
FIG. 8F is a front view of the self-locking jack of FIG. 1, illustrating the hydraulic force being removed, and the spring loaded locks biasing against the second cribbing block.

As shown in FIG. 8F, the lowermost block 74*b* prevents the locks 30, 34 from completely returning to the locked position, and the locks 30, 34 contact the tapered edges 84. The springs 38 bias the locks 30, 34 into contact with the lowermost block 74*b* and the locks move along the tapered edges 84 as the lowermost block 74*b* is lowered (i.e., opposite of the interaction when the block 74 is raised). The wheels 90 reduce the friction between the locks 30, 34 and the tapered edges 84 as the blocks 74 are lowered.

As shown in FIG. 8G, the locks 30, 34 return to the locked position after the lower end 78 of the lowermost block 74*b* passes beneath the locks 30, 34. The main cylinder 86 continues to lower the stack until the adjacent block 74 (i.e., first block 74*a*) is supported by the planar surfaces 36. The main cylinder 86 continues to lower the lowermost block 74*b* while the adjacent block (e.g., the first block 74*a*) remains on the planar surfaces 36, thereby separating the lowermost block 74*b* from the support stack (see e.g., FIG. 8H).

Figure 8I:
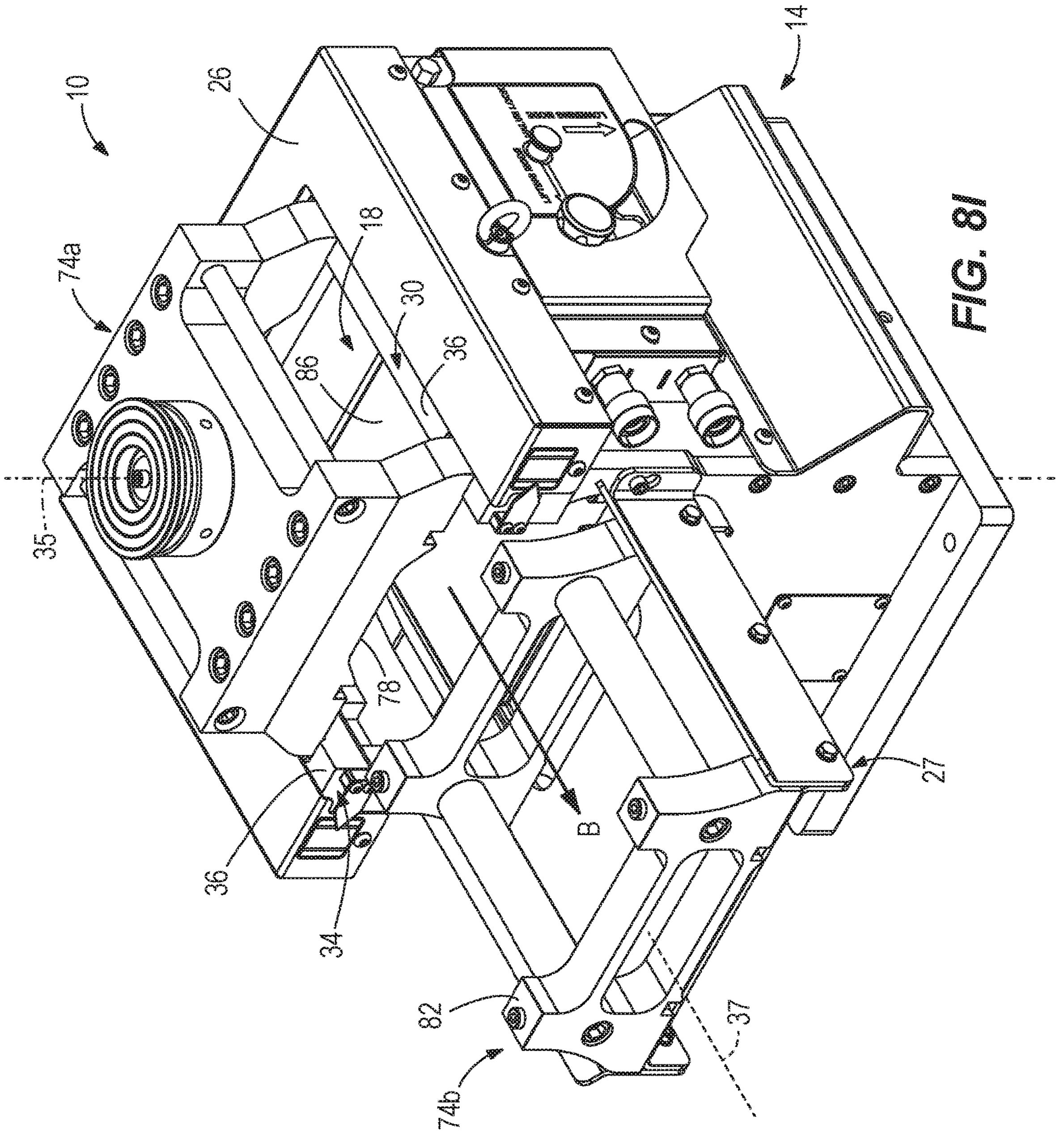
FIG. 8I is a front view of the self-locking jack of FIG. 1, illustrating removing the second cribbing block from the cavity.

As shown in FIG. 8I, the lowermost block 74*b* may then be manually removed from the cavity 18 by sliding the block 74 along the tray 27 in the direction of arrow B. The process of removing blocks 74 can be repeated until all of the blocks have been removed from the stack, or the load has been lowered a predetermined distance.

Although aspects have been described in detail with reference to certain preferred embodiments, variations and modifications exist within the scope of one or more independent aspects as described.

What is claimed is:

1. A jack comprising:

a main body including a cavity;

a lifting actuator supported on the main body and extendable into the cavity;

a lock movably coupled to the main body;

a spring coupled to the lock and biasing the lock into the cavity; and a lock actuator coupled to the lock and selectively biasing the lock out of the cavity against a biasing force of the spring;

wherein the cavity is open on a first side and a second side, the cavity configured to receive a cribbing member through the first side to be lifted by the lifting actuator toward the second side, lifting movement of the cribbing member causing the lock to move at least partially out of the cavity.

2. The jack of claim 1, wherein the lock is a first lock, the spring is a first spring, and the lock actuator is a first lock actuator, the jack further comprising a second lock movably coupled to the main body opposite the first lock;

a second spring coupled to the second lock and configured to bias the second lock into the cavity; and a second lock actuator coupled to the second lock and configured to bias the second lock out of the cavity when supplied with fluid.

3. The jack of claim 1, wherein the main body further comprises a lever moveable between a first position and a second position, wherein fluid is prevented from reaching the lock actuator while the lever is in the first position, and fluid reaches the lock actuator and exerts a fluid force on the lock greater than a spring force exerted by the spring while the lever is in the second position.

4. The jack of claim 1, further comprising a tray coupled to the main body, the tray having a width substantially equivalent to a width of the cavity.

5. A jack comprising:

a main body including a cavity;

a lifting actuator supported on the main body and extendable into the cavity;

a lock movably coupled to the main body;

a spring coupled to the lock and biasing the lock into the cavity; and a lock actuator coupled to the lock and selectively biasing the lock out of the cavity against a biasing force of the spring, wherein the lock includes a wheel rotatable relative to the main body and configured to engage a surface of a cribbing member that is supported by the lifting actuator.

6. The jack of claim 5, wherein the cavity is open on a first side and a second side of the main body.

7. A jack comprising:

a main body including a cavity;

a first lock movably coupled to the main body and biased into the cavity;

a second lock movably coupled to the main body and positioned opposite the first lock, the second lock biased into the cavity; and a main actuator coupled to the main body and movable through the cavity, wherein the cavity is open on a first side and a second side, the cavity configured to receive a cribbing member through the first side to be lifted by the main actuator toward the second side, lifting movement of the cribbing member causing the first lock and the second lock to move at least partially out of the cavity.

8. The jack of claim 7, wherein the main actuator is movable in a direction generally orthogonal with respect to a plane in which at least one of the first lock and the second lock is positioned.

9. The jack of claim 7, wherein a width of the main actuator is less than a distance between the first lock and the second lock biased into the cavity.

10. The jack of claim 7, further comprising a first spring coupled to the first lock and a second spring coupled to the second lock, the first and second springs applying a spring force to bias the respective first and second locks.

11. The jack of claim 10, further comprising a first cylinder coupled to the first lock and a second cylinder coupled to the second lock, the first cylinder and second cylinder configured to receive a fluid and apply a fluid force directed opposite the spring force to move the first and second locks at least partially out of the cavity.

12. A jack comprising:

a main body including a cavity;

a first lock movably coupled to the main body and biased into the cavity;

a second lock movably coupled to the main body and positioned opposite the first lock, the second lock biased into the cavity; and a main actuator coupled to the main body and movable through the cavity, wherein the first lock includes a wheel rotatable relative to the main body and configured to engage a surface of a cribbing member that is supported by the main actuator.

13. The jack of claim 12, wherein the cavity is open on a first side and a second side, the cavity configured to receive a cribbing member through the first side to be lifted by the main actuator toward the second side, lifting movement of the cribbing member causing the first lock and the second lock to move at least partially out of the cavity.

14. The jack of claim 7, further comprising a tray coupled to the main body, the tray having a width substantially equivalent to a width of the cavity.

15. A method of supporting a load with a jack, the jack including a main body with a cavity and locks biased into the cavity, the method comprising:

positioning a cribbing block proximate the cavity;

extending a main actuator to engage the cribbing block and lift the cribbing block relative to the cavity;

moving the locks at least partially out of the cavity to allow the cribbing block to pass between the locks;

after the cribbing block passes at least partially between the locks, returning the locks to their initial position; and supporting the cribbing block on an upper surface of the locks.

16. The method of claim 15, further comprising contacting the locks with a tapered outer edge of the cribbing block.

17. The method of claim 15, further comprising supplying a hydraulic fluid to lock actuators coupled to the locks, the lock actuator providing a fluid force to the locks to move the locks at least partially out of the cavity.

18. The method of claim 15, further comprising moving a valve from a first position to a second position in order to provide fluid communication with lock actuators.

19. The method of claim 15, wherein extending the main actuator to engage the cribbing block and lift the cribbing block relative to the cavity further includes lifting the cribbing block off the upper surface of the locks, and wherein the method further includes retracting the main actuator and lowering the cribbing block into the cavity.

20. The method of claim 15, wherein returning the locks to their initial position further includes automatically returning the locks to their initial position.

* * * * *